United States Patent [19]

Park et al.

[11] Patent Number: 4,550,088

[45] Date of Patent: Oct. 29, 1985

[54] CERAMIC COMPOSITION FOR DIELECTRIC IN MULTILAYER CAPACITORS

[75] Inventors: Hyun D. Park, Taylors; Arthur E. Brown, Mauldin, both of S.C.

[73] Assignee: Union Carbide Corporation, Danbury, Conn.

[21] Appl. No.: 713,556

[22] Filed: Mar. 19, 1985

Related U.S. Application Data

[63] Continuation of Ser. No. 599,977, Apr. 19, 1984, abandoned.

[51] Int. Cl.[4] .......................... C04B 35/00; H01B 3/12
[52] U.S. Cl. ..................................... 501/135; 501/17; 501/32; 501/76; 501/134
[58] Field of Search ................. 501/135, 134, 17, 32, 501/76

[56] References Cited

U.S. PATENT DOCUMENTS

| | | | |
|---|---|---|---|
| 4,078,938 | 3/1978 | Yonezawa et al. | 501/134 |
| 4,158,219 | 6/1979 | Payne et al. | 252/520 |
| 4,216,102 | 8/1980 | Furukawa et al. | 501/135 |
| 4,218,723 | 8/1980 | Payne et al. | 252/520 |
| 4,287,075 | 9/1981 | Fujiwara et al. | 501/135 |
| 4,482,935 | 11/1984 | Wheeler | 501/135 |

FOREIGN PATENT DOCUMENTS

| | | | |
|---|---|---|---|
| 42009 | 12/1981 | European Pat. Off. | |
| 2126575 | 3/1984 | United Kingdom | 501/135 |

OTHER PUBLICATIONS

Swartz et al.; "Fabrication of Perovskite Lead Magnesium Niobate", Materials Research Laboratory, The Pennsylvania State University, University Park, Pa. 16802.

Fesenko et al.; "Synthesis and Examination of Ferroelectric Perovskites Containing Vacancies", Bulletin Academic Science Phys., Series 33, No. 7, 1969.

Yonezawa et al.; "Properties of the Multilayer Capacitor $Pb(Zn_{\frac{1}{3}}Nb_{\frac{2}{3}})O_3$—$Pb(Fe_{\frac{1}{2}}Nb_{\frac{1}{2}})O_3$—$Pb(Fe_{\frac{2}{3}}W_{\frac{1}{3}})O_3$ Ternary System", 1979 Proceedings of the 2nd Meeting on Ferroelectric Materials and Their Applications.

Primary Examiner—Mark L. Bell
Attorney, Agent, or Firm—Frederick J. McCarthy, Jr.

[57] ABSTRACT

Lead oxide-base material for multilayer ceramic capacitors having high dielectric constant and insulation resistance over wide temperature range, e.g., 10° C. to 85° C.

3 Claims, 7 Drawing Figures

CERAMIC COMPOSITION FOR DIELECTRIC IN MULTILAYER CAPACITORS

This application is a continuation of prior U.S. application Ser. No. 599,977, filed Apr. 19, 1984, now abandoned.

The present invention is related to ceramic compositions having a high dielectric constant and high insulation resistance at temperatures up to 85° C. and which are capable of being formed by sintering a mixture of oxides at relatively low temperatures in the range of about 900° to 1050° C. More particularly, the present invention is directed to ceramic compositions particularly suited for use as the dielectric in multilayer ceramic capacitors.

Ceramic compositions using barium titanate have been used successfully as the dielectric materials for ceramic capacitors; however, such compositions require relatively high sintering temperatures, e.g., 1200° C. and higher, and this precludes the use of relatively inexpensive metal, such as silver and nickel, as capacitor electrodes, and mandates the use of higher melting, expensive precious metals, such as platinum.

Recently, lead oxide-based perovskite dielectric systems have been proposed to achieve low sintering temperatures while providing a relatively high dielectric constant and insulation resistance, for example, U.S. Pat. No. 4,216,102 to Furukawa et al. Such prior art lead oxide-based solid solution systems provide significant advantages, however there remains the need to provide high dielectric constants with increased temperature dependence stability and higher insulation resistance at high temperatures, more comparable to barium titanate base dielectrics.

Accordingly, it is an object of the present invention to provide a ceramic composition which can be sintered at relatively low temperatures and which is characterized by improved dielectric constant and insulation resistance at temperatures up to 85° C.

Other objects will be apparent from the following description and claims taken in conjunction with the drawings wherein:

FIG. 1 shows a photomicrograph (original magnification 570×) of the microstructure of a multilayer capacitor having a dielectric of sintered ceramic material in accordance with the present invention.

FIGS. 2a, 2b, and 2c are graphs showing the dielectric constant and insulation resistance values obtained from various ceramic compositions.

Figure 1:
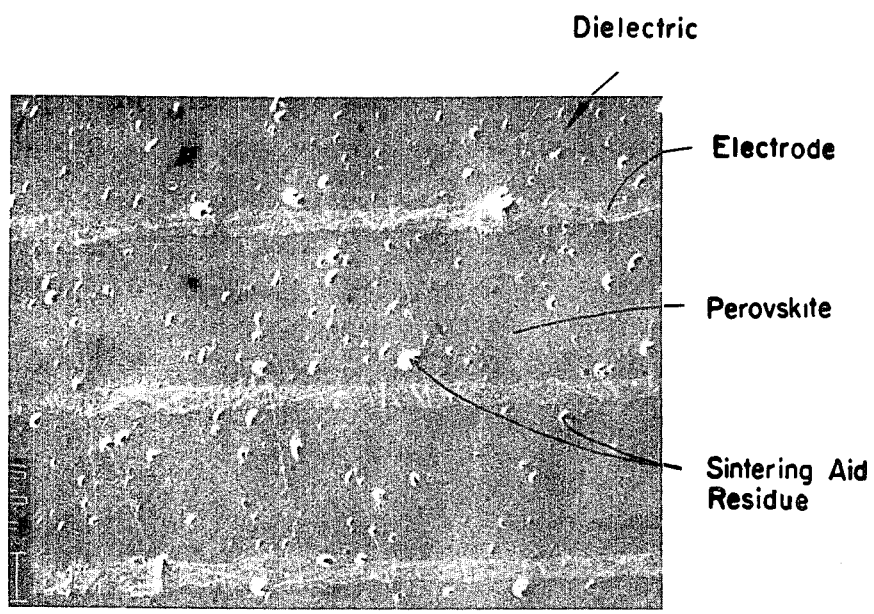

A ceramic composition in accordance with the present invention is characterized by being sinterable at temperatures in the range of 900° to 1050° C. and having a dielectric constant (K) of at least 10,000 at 25° C. and 10,000 (+22% to −56%) over the range of 10°–85° C. and insulation resistance of at least $10^{12}$ ohm-cm at 25° C. and $10^{11}$ ohm-cm at 85° C. These characteristics satisfy EIA standard RS-198-C for Z5U capacitors.

The lead oxide-base sintered ceramic dielectric composition of the present invention, on an oxide basis, consists essentially, of, by weight:

2.49 to 6.67% $Fe_2O_3$
24.18 to 28.14% $Nb_2O_5$
2.09 to 3.59% $MgO$
0.025 to 0.10% $MnO_2$
0.20 to 1.50% in the aggregate of one or more of the following oxides: $GeO_2$, $SiO_2$, $Bi_2O_3$, $CdO$, $ZnO$, $Al_2O_3$, $CuO$ and $B_2O_3$, chemically combined with at least 20% by weight of PbO, to form a sintering aid having a melting point of not higher than 775° C. and a resistivity at 25° C. of at least $10^{13}$ ohm-cm, said dielectric composition having a total lead oxide content, as PbO, of from 64.32 to 66.20% and having an atomic ratio of Pb to the sum of Nb, Fe and Mg from 0.893 to 0.913 and a weight ratio of MgO to $Fe_2O_3$ from 0.34 to 1.3.

The above-defined composition provides low sintering ceramic (900° to 1050° C.) having an optimum combination of dielectric constant and insulation resistance characterstics. The relatively low PbO content is particularly important to the achievement of high dielectric constant as are the relationships recited with respect to Pb, Fe, Mg and Nb. The relatively minor amounts of $MnO_2$ and of the sintering aid additives enable optimum densification of the dielectric, and ehance the insulation resistance, especially at high temperatures (e.g., 85° C.). Further, these additives in combination result in the insulation resistance remaining high during capacitor life testing under high temperature and voltage stresses.

In the practice of the present invention, a blended mixture of finely divided particles of PbO, MgO, $Fe_2O_3$ and $Nb_2O_5$ is provided in appropriate proportions and manganese, e.g., in the form of a manganese-containing salt such as manganous nitrate or acetate, is added to provide the desired $MnO_2$ content in the sintered ceramic, and the mixture is calcined at about 720° to 780° C. for about 60 to 180 minutes in an air atmosphere. The resulting calcine material is milled to a size of about 0.6 micron and blended with finely divided (e.g., ~1 micron) oxide sintering aid additive, in the amount of about 1-3% by weight of the calcine. Suitable sintering aid materials include $Pb_5Ge_{1.95}Si_{1.05}O_{11}$, (melting point 720° C., resistivity $>10^{13}$ Ohm-cm and lead-containing glasses such as compositions A and B in Table A, below.

TABLE A

| | Sintering Aids | |
|---|---|---|
| | A | B |
| PbO | 61.6 | 24.8 (wt. %) |
| CdO | — | 35.5 |
| $Bi_2O_3$ | 2.4 | 24.5 |
| $B_2O_3$ | 14.5 | 5.2 |
| $SiO_2$ | 2.5 | 4.9 |
| ZnO | 15.2 | 4.0 |
| $Al_2O_3$ | — | 1.0 |
| CuO | 3.8 | — |
| M.P. | 500° C. | 700° C. |
| Resistivity | $>10^{13}$ ohm-cm | $>10^{13}$ ohm-cm |

The mixture thus obtained is sintered at 900° to 1050° C. for about 60 to 180 minutes in the course of which the calcine and the sintering aid constituents react to provide a reaction product characterized by a microstructure comprising a predominantly lead perovskite solid solution phase surrounding discrete regions of sintering aid metal oxide residues. A representative microstructure (original magnification 570×) is shown in FIG. 1 wherein 1 indicates generally the dielectric composition of the invention, and 2 is a capacitor electrode typically made of silver containing 5 to 25 wt. % palladium. The lead-containing perovskite phase of the dielectric composition is indicated at 3. The dark regions 4 surrounded by the perovskite dielectric phase 3 are sintering aid metal oxide residues, $SiO_2$ and $GeO_2$.

Ceramic dielectric material in accordance with the present invention is used as the dielectric for multilayer ceramic capacitors following conventional practice and using relatively inexpensive metals such as silver and its alloys as the electrode material.

The following examples will further illustrate the present invention:

EXAMPLE

A calcine material was prepared from the following:

| | | |
|---|---|---|
| PbO | sized 4.5 micron | mean particle |
| $MgCO_3$ | sized 3 micron | size as determined |
| $Fe_2O_3$ | sized 0.5 micron | by the Sedigraph TM |
| $Nb_2O_3$ | sized 3 micron | technique. |

The materials were milled, dried and calcined at 750° C. for 120 minutes.

In some instances, $Mn(NO_3)_2$ was added to the mixture before calcining to provide a desired $MnO_2$ content in the calcine and, in further instances, oxidic sintering aid material was added after calcining to provide a desired sintering aid content.

Materials as above described were sintered at 965° to 1050° C. for about 120 minutes to obtain a dense ceramic, and conventional practices to make multilayer ceramic capacitors were followed.

The multilayer capacitors had individual dielectric layers of about 1.2 mils thickness and a total capacitance of about 1 microfarad (for a dielectric constant of 10,000).

Figure 2A:
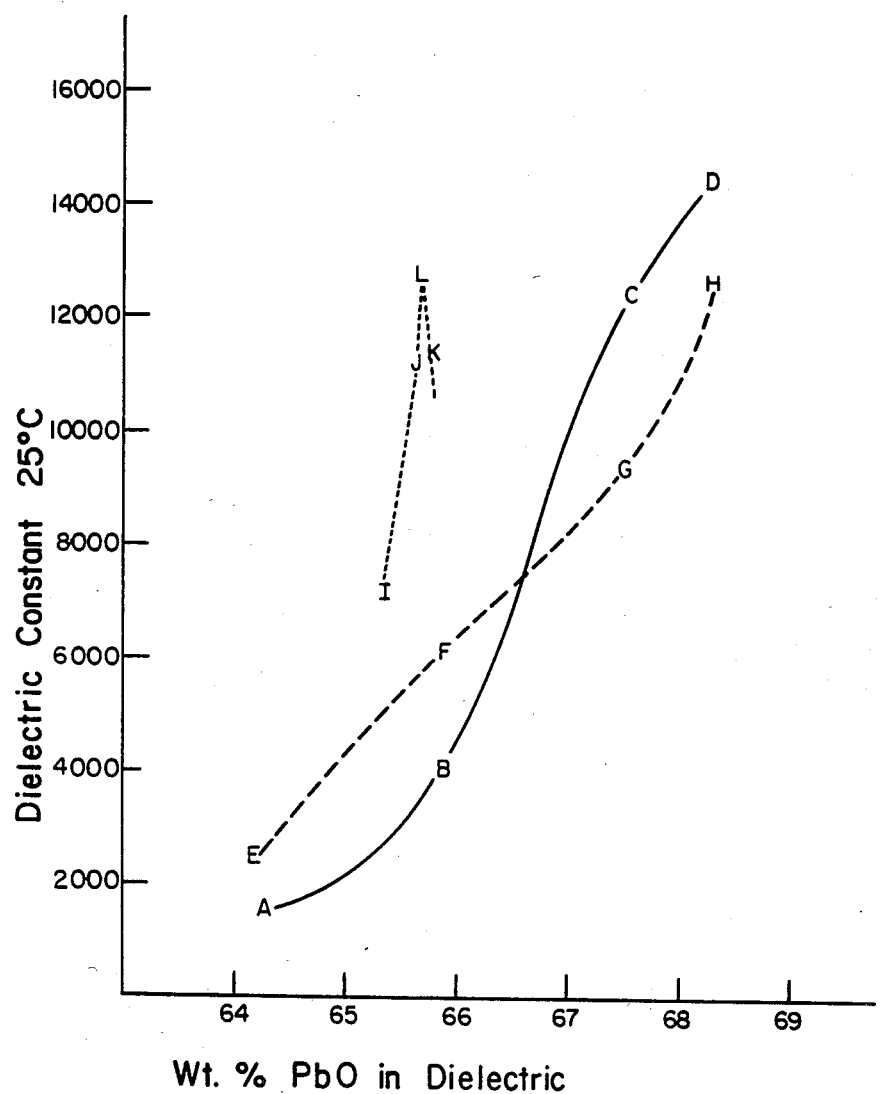
Figure 2B:
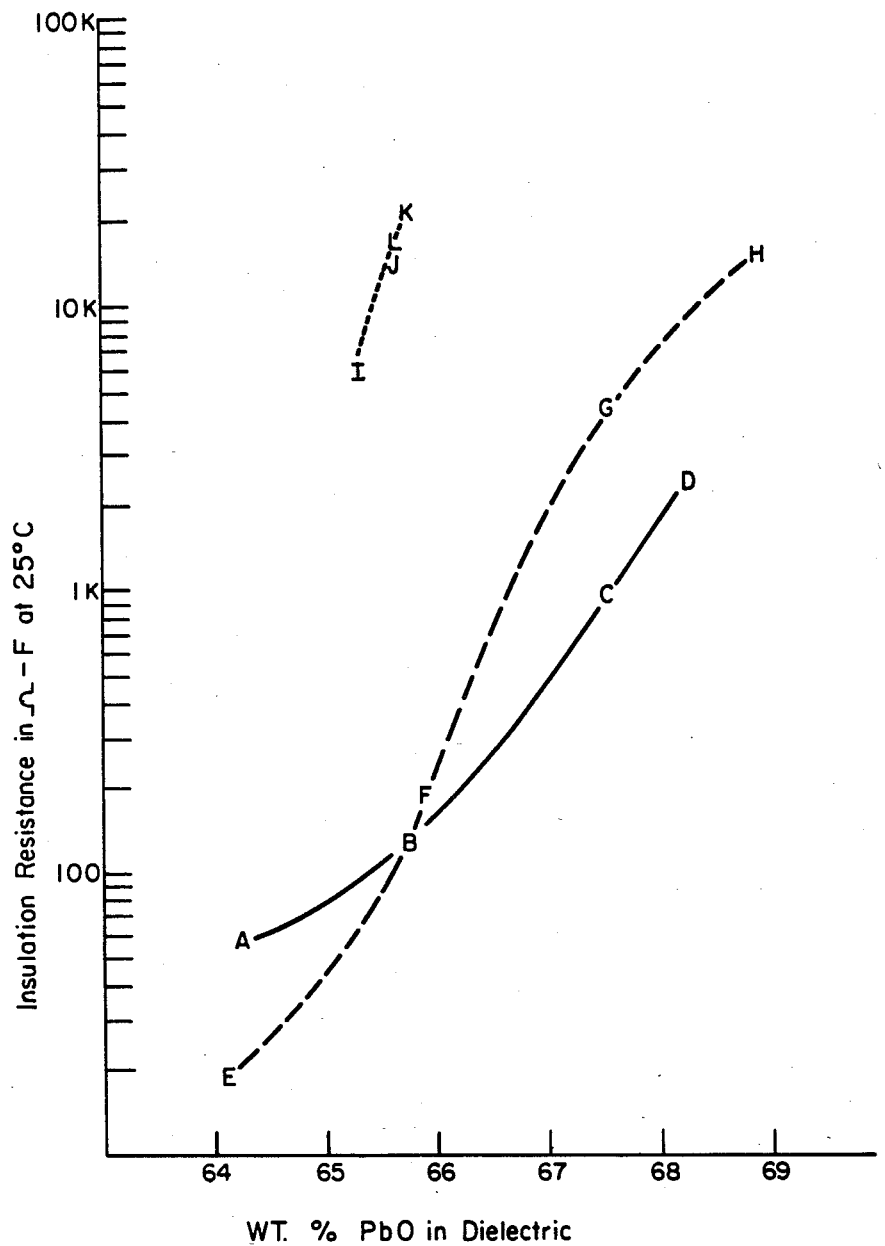
Figure 2C:
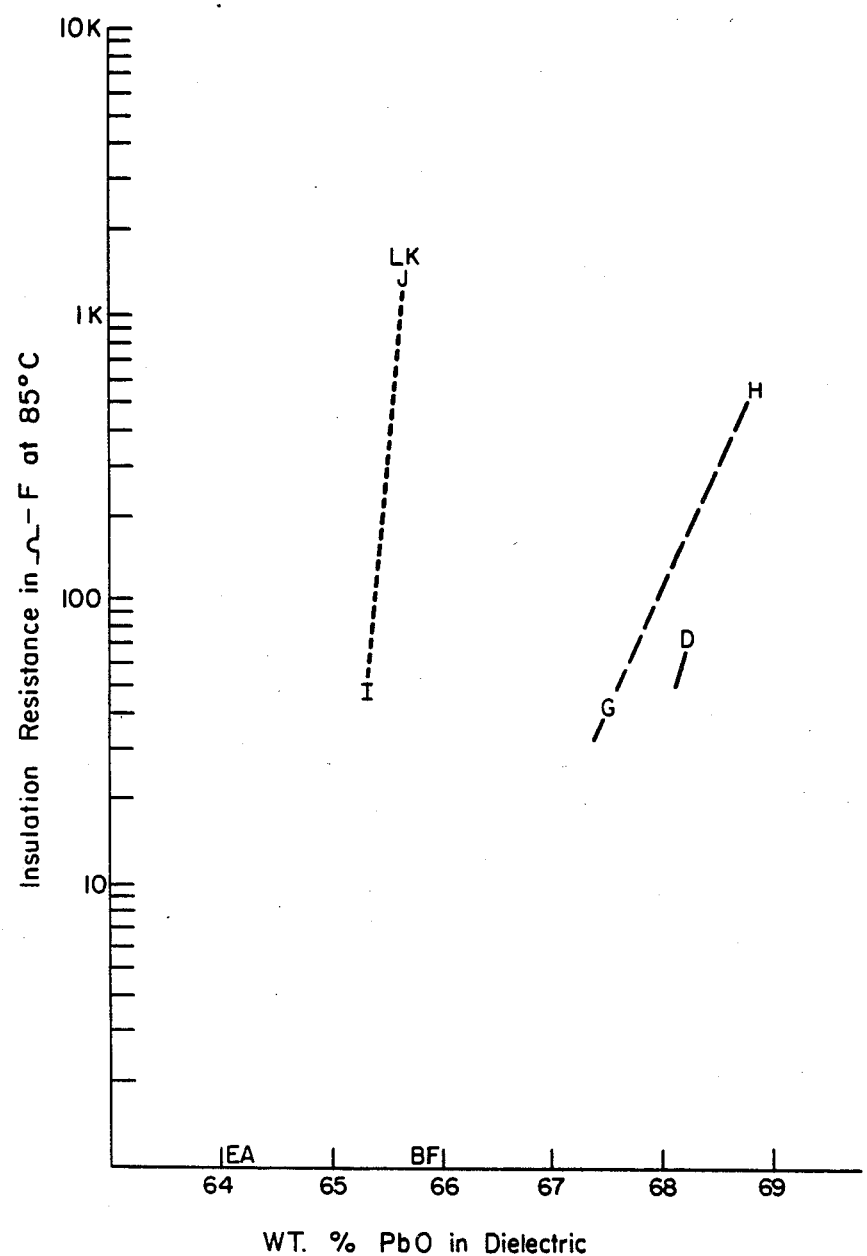

The fired dielectric compositions are shown in Table 1 and the dielectric properties are listed in Table II. The data from Table II are plotted in FIGS. 2a, 2b and 2c and FIG. 4. Samples A–H, not in accordance with the present invention, reflect the known behavior of lead magnesium iron niobate as described in U.S. Pat. No. 4,216,102 and elsewhere in the prior art. That is, as the PbO content approaches the stoichiometric value of about 68.25 wt. % for $0.35Pb(Fe_{\frac{1}{2}}Nb_{\frac{1}{2}})O_3.0.65Pb(Mg_{\frac{1}{3}}Nb_{\frac{2}{3}})O_3$, the dielectric constant and the insulation resistance of the material both increase sharply (Samples A–H as shown in FIGS. 2a–c and Table II). Sample I was made generally in accord with the present invention, but with an incorrect ratio of $Pb/Nb+Mg+Fe$. The presence of $MnO_2$ (compare series E–H with A–D) increases the insulation resistance of the composition when the PbO content is near its stoichiometric value. In sharp contrast, the compositions of this invention (Samples J, K, L) exhibit a high dielectric constant and very high insulation resistance at a significantly substoichiometric PbO content, at which other formulations exhibit low dielectric contants and very low insulation resistances, particularly at high temperatures, as can be seen in FIGS. 2c and FIG. 4.

Figure 4:
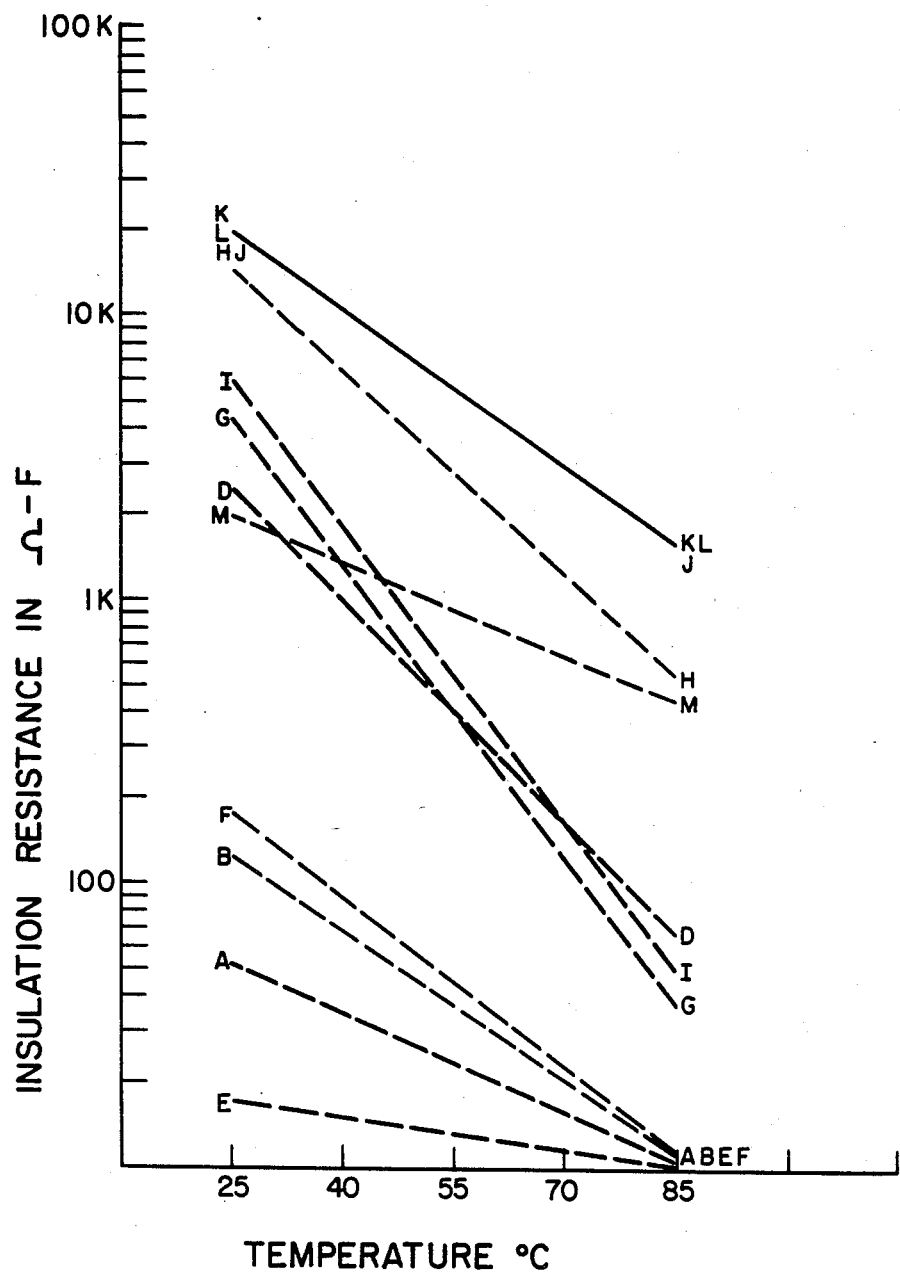
FIG. 4 is a graph showing insulation resistance as a function of temperature for various lead oxide-based dielectric materials.

FIG. 4 is a graph showing insulation resistance as a function of temperature for the materials of the example. As can be seen, the materials J, K, L in accordance with the present invention are superior.

Figure 5:
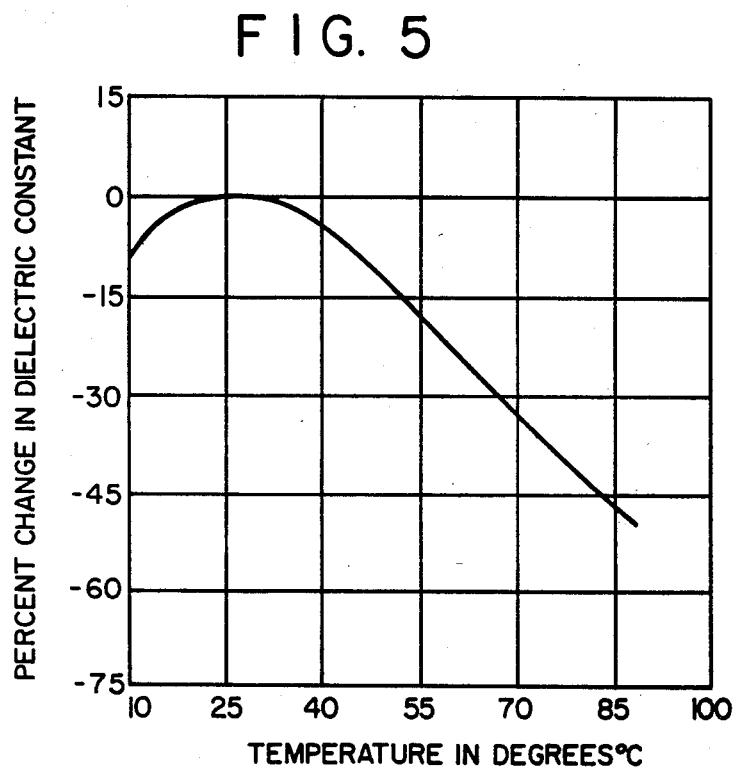
FIG. 5 is a graph showing temperature dependence characteristics of the lead oxide-base dielectric of the present invention.

FIG. 5 is a graph showing dielectric constant change with temperature for materials in accordance with the present invention.

As can be seen, the temperature dependence of the dielectric constant is very good and well within the specification for Z5U type capacitors as established by Electric Industries Association Standard RS-198-C (November 1983.)

Figure 3:
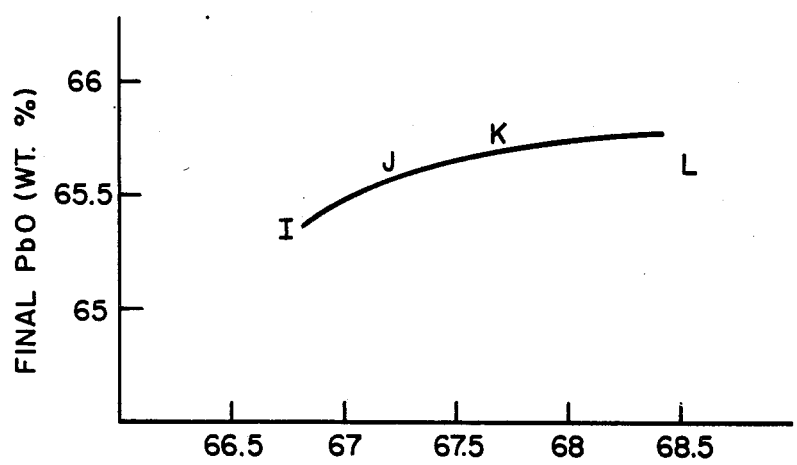
FIG. 3 shows the relationship between the starting lead oxide compositions and the final compositions of dielectrics of this invention.

A significant aspect of the formulations of this invention is the manner in which they can be sintered. The usual practice is to sinter PbO containing perovskites in closed crucibles often with lead-containing "atmosphere powders" near the bodies to minimize lead loss. In the practice of the present invention sintering can be accomplished in open containers such as those used to make barium titanate multilayer capacitors, using an excess of PbO. PbO loss from the dielectric during sintering results in the achievement of the desired PbO content. FIG. 3 shows the PbO content for the presintered mixture and sintered composition for samples J, K, L of the present invention. A relatively wide range of initial high PbO contents results in a narrow range of final composition in accordance with the present invention. It is ususally desirable, however, to use starting compositions which are relatively low in Pbo content as illustrated in FIG. 3 to minimized the amount of PbO which is evaporated from the body. Variations in the Fe and Mg contents and sintering aid content additive affect somewhat the value of the final PbO content and can be used to adjust the temperature coefficient of capacitance and sintering behavior of the dielectric.

TABLE I

| Sample | PbO | $Fe_2O_3$ | MgO | $Nb_2O_5$ | $MnO_2$ | Germanium Oxide Plus Silicon Oxide | Sintering Temp. (°C.) | Atomic Ratio $\frac{Pb}{Fe + Mg + Nb}$ |
|---|---|---|---|---|---|---|---|---|
| A | 64.26 | 4.82 | 3.02 | 27.91 | — | — | 1050 | .834 |
| B | 65.75 | 4.62 | 2.90 | 26.75 | — | — | 1050 | .890 |
| C | 67.53 | 4.38 | 2.74 | 25.35 | — | — | 1060 | .965 |
| D | 68.24 | 4.28 | 2.68 | 24.81 | — | — | 1060 | .997 |
| E | 64.15 | 4.83 | 3.02 | 27.94 | 0.05 | — | 1050 | .832 |
| F | 64.34 | 4.59 | 2.87 | 26.56 | 0.05 | — | 1050 | .886 |
| G | 67.53 | 4.37 | 2.74 | 25.31 | 0.05 | — | 1050 | .966 |
| H | 68.87 | 4.28 | 2.62 | 24.26 | 0.05 | — | 1050 | 1.028 |
| I | 65.38 | 4.62 | 2.89 | 26.70 | 0.06 | 0.40 | 1025 | .886 |
| J | 65.65 | 4.57 | 2.86 | 26.46 | 0.05 | 0.40 | 1025 | .899 |
| K | 65.75 | 4.56 | 2.85 | 26.37 | 0.05 | 0.41 | 1025 | .903 |
| L | 65.61 | 4.58 | 2.85 | 26.48 | 0.05 | 0.43 | 1025 | .898 |
| M | 67.50 | 4.33 | 2.71 | 25.05 | — | 0.40 | 975 | .976 |

TABLE II

| Sample | PbO Content (Wt. %) | $K_{25°\ C.}$ | $IR_{25°\ C.}$ $\Omega - F.$ | $IR_{85°\ C.}$ $\Omega - F.$ |
|---|---|---|---|---|
| A | 64.26 | 1690 | 56 | v. low |

TABLE II-continued

| Sample | PbO Content (Wt. %) | $K_{25° C.}$ | $IR_{25° C.}$ $\Omega$ –F. | $IR_{85° C.}$ $\Omega$ –F. |
| --- | --- | --- | --- | --- |
| B | 65.75 | 4020 | 132 | low |
| C | 67.53 | 12500 | 1000 | — |
| D | 68.24 | 15440 | 2430 | 71 |
| E | 64.15 | 2335 | 18 | v. low |
| F | 65.94 | 6210 | 175 | low |
| G | 67.53 | 9430 | 4430 | 44 |
| H | 68.87 | 12740 | 14590 | 560 |
| I | 65.33 | 7235 | 5990 | 52 |
| J | 65.65 | 11300 | 14500 | 1450 |
| K | 65.75 | 11500 | 21000 | 1679 |
| L | 65.61 | 12800 | 16730 | 1673 |
| M | 67.50 | 7650 | 2066 | 455 |

What is claimed is:

1. A lead oxide-base dielectric ceramic material having high dielectric constant and high insulation resistance which is capable of being formed from a mixture of oxide powders by sintering at temperatures in the range of 900° to 1050° C., said ceramic material consisting essentially of by weight, 2.49 to 6.67% $Fe_2O_3$
24.18 to 28.14% $Nb_2O_5$
2.09 to 3.59% MgO
0.025 to 0.10% $MnO_2$
0.20 to 1.50% in the aggregate of one or more of the following oxides: $GeO_2$, $SiO_2$, $Bi_2O_3$, CdO, ZnO, $Al_2O_3$, CuO and $B_2O_3$, chemically combined with at least 20% by weight of PbO, to form a sintering aid additive having a melting point of no more than 775° C. and a resistivity at 25° C. of at least $10^{13}$ ohm-cm, said dielectric composition having a total lead oxide content, as PbO, of from 64.32 to 66.20% and having an atomic ratio of Pb to the sum of Nb, Fe and Mg of from 0.893 to 0.913 and the weight ratio of MgO to FeO is from 0.34 to 1.3.

2. A ceramic material in accordance with claim 1, wherein the dielectric constant is at least 10,000 and the insulation resistance is at least $10^{12}$ ohm-cm at 25° C. and $10^{11}$ ohm-cm at 85° C.

3. A ceramic material in accordance with claim 1 which is characterized by a microstructure comprising a predominantly lead perovskite solid solution phase as determined by X-ray diffraction surrounding small discrete regions of metal oxide residues of sintering aid additive.

* * * * *